United States Patent
Kovacs et al.

(10) Patent No.: US 7,516,201 B2
(45) Date of Patent: Apr. 7, 2009

(54) COMMUNICATION DEVICE AND SOFTWARE FOR OPERATING MULTIMEDIA APPLICATIONS

(75) Inventors: Ernö Kovacs, Stuttgart (DE); Davide Mandato, Fellbach (DE)

(73) Assignee: Sony Deutschland GmbH, Cologne (DE)

( * ) Notice: Subject to any disclaimer, the term of this patent is extended or adjusted under 35 U.S.C. 154(b) by 618 days.

(21) Appl. No.: 09/728,018

(22) Filed: Dec. 1, 2000

(65) Prior Publication Data

US 2001/0003191 A1  Jun. 7, 2001

(30) Foreign Application Priority Data

Dec. 3, 1999  (EP)  .................................. 99124216

(51) Int. Cl.
G06F 15/173 (2006.01)
G06F 12/00 (2006.01)
G06F 17/30 (2006.01)
G06F 15/167 (2006.01)

(52) U.S. Cl. .................... 709/223; 709/213; 707/200

(58) Field of Classification Search ................. 709/223, 709/224; 707/200
See application file for complete search history.

(56) References Cited

U.S. PATENT DOCUMENTS 5,953,350 A * 9/1999 Higgins ..................... 370/524
5,956,331 A * 9/1999 Rautiola et al. ............. 370/338
6,055,593 A * 4/2000 Shaberman et al. ........... 710/74

FOREIGN PATENT DOCUMENTS

EP  0 854 605  7/1998
WO  WO 98 17032  4/1998

OTHER PUBLICATIONS

Hanson, Eric N. "The Design and Implementation of the Ariel Active Database Rule System," Sep. 1991, University of Florida, pp. 1-39.*
Leler, Wm, "Linda Meets Unix," Feb. 1990, IEEE, vol. 23, Issue 2, pp. 43-54.*

(Continued)

*Primary Examiner*—Patrice Winder
*Assistant Examiner*—Azizul Choudhury
(74) *Attorney, Agent, or Firm*—Oblon, Spivak, McClelland, Maier & Neustadt, P.C.

(57) ABSTRACT

The present invention relates to a communication device and a software for operating multimedia applications in one or more communication networks, with a computing manager unit (52) for managing and providing multimedia applications on the basis of a communication with one or more communication devices in the one or more communication networks, whereby the computing manager unit (52) controls a device discovery manager unit (58) for detecting the availability of one or more devices and/or one or more communication networks, a service discovery manager unit (56) for providing available services from and/or for said one or more communication networks, and a virtual device manager unit (60) providing a graphical user interface for controlling devices and/or services of the one or more communication networks.

The present invention particularly enables mobile multimedia applications to effectively use mobile ad-hoc networks in a simple and effective way.

17 Claims, 4 Drawing Sheets

OTHER PUBLICATIONS

Cabri, Giacomo et al, "Design and Implementation of a Programmable Coordination Architecture for Mobile Agents," Jun. 1999, IEEE, pp. 1-9.*

Guttman E: "Service Location Protocol: Automatic Discovery of IP Network Services" IEEE Internet Computing, IEEE, USA, vol. 3, No. 4, Jul. 1, 1999-Aug. 31, 1999, pp. 71-80, XP002140936.

Guttman E et al: "Automatic Discovery of Thin Servers: SLP, Jini and the SLP-Jini Bridge" IECON'99, Conference Proceedings. 25th Annual Conference of the IEEE Industrial Electronics Society (CAT. No. 99CH37029), Electronics Society, San Jose, CA, USA, vol. 2, Nov. 29, 1999-Dec. 3, 1999, pp. 722-727, XP002140937.

* cited by examiner

COMMUNICATION DEVICE AND SOFTWARE FOR OPERATING MULTIMEDIA APPLICATIONS

The present invention relates to a communication device and software for operating multimedia applications in one or more communication networks. The general field of the present invention is thereby the field of mobile multimedia middleware, computer networking, handheld computers, wireless communication and mobile ad-hoc networks.

A multimedia application is a set of co-operating software units active on one or more hardware units, which communicate with each other via a network of cabled and/or wireless communication links. The goal of a multimedia application is to perform a set of tasks, which are related to the exchange of information in various formats, such as audio, still and moving picture, text and a mix thereof.

In order to achieve such goals, several network models are available, depending on whether the network is managed or not, whether it is based on a fixed hardware infrastructure or on a set of mobile devices. Such network models can be sufficiently complex so as to encompass any combination thereof.

At present it is envisioned that multimedia applications exploiting the concept of mobile ad-hoc networks will become the subject of a fast-growing market. Consumers will in fact be able to leverage a synergy of existing fixed network-based internet services, increasingly more powerful handheld devices and fast, ubiquitous wireless communication devices in order to accomplish ad-hoc, complex, resouce- and quality-demanding applications, such as:

- local information retrieval: a traveller will be able to consult local airport information through his personal digital assistant, to look at movie schedules advertised by a number of movie theaters located in the vicinity or the like.
- local resource integration: a lecturer entering into a meeting room will be able to use resources located in that room, such as a beamer, a microphone, a modem, etc., in order to deliver a multimedia presentation,
- local community: a group of people located in a certain place will be able to communicate with each other in order to perform a collective task, such as playing a multi-user electronic game.

The list of potential applications is almost unlimited and the reason for this is just the spontaneity characteristic of a mobile ad-hoc network.

A mobile ad-hoc network is modelled as a directed graph, composed of a set of nodes, which are connected by a set of directed, full-duplex communication links. By definition, mobile ad-hoc networks are spontaneously created whenever a set of nodes discover each other in a geographically delimited area. Therefore, mobile ad-hoc networks are unmanaged and a mobile ad-hoc network graph topology may change over time.

In practice, nodes are either static or mobile devices and comprise computing units (either single or multiprocessor units), which are connected to network-interface units. Given the inherently spontaneous and thus unmanaged nature of mobile ad-hoc networks, nodes must be uniquely identified by randomly allocating a proper network identifier (address) to each node at the time the node joins the mobile ad-hoc network. In case e.g. a dynamic host configuration protocol (DHCP) server became later available to a given existing mobile ad-hoc network, the address allocation should be accordingly reapplied to each node.

In order to perform a given set of tasks, nodes can communicate with each other by exchanging information via messages across the set of mobile ad-hoc network links. Typically, mobile ad-hoc networks employ wireless communication links, but mix and match solutions may exist, in which certain links consist of ad-hoc cable connection. Links are characterized by a set of physically related attributes identifying the quality of service links can support, such as the maximum bandwidth allowed and the maximum and minimum transport delay. Such parameters influence the message transmission performance.

In such a context, topology changes may occur insofar as nodes may join, move and leave the mobile ad-hoc network. Besides, links may become unavailable due to nodes' network interfaces hardware failures and/or to environmental conditions, e.g. weather conditions can degrade radio frequency or infrared signals used for wireless communication links between nodes. Given the essentially wireless nature of mobile ad-hoc networks, environmental conditions can also affect a quality of service properties of communication links, whereby the properties can thus change over time.

Proper routing capabilities are provided at each node in order to forward any received message, which a given node is not the recipient of. Given the time variant characteristic of links quality of service properties and the typical multimedia applications dependency on such parameters, the routing algorithm to be used in mobile ad-hoc network nodes is designed to take into account such link properties. Messages to be forwarded are thus routed over the least-cost links, which ensure, that the overall path quality of service properties actually meet a given multimedia applications quality of service requirement.

On top of any network model, at application level one can identify logical entities, called services, which can be used as building blocks for creating complex multimedia applications. A service is either a hardware or a software unit providing a useful, general purpose functionality.

The model behind the concept of service is the client-server architecture, in which multimedia applications request a service to be performed by using a client software unit, which communicates over a network connection with a server software unit. The latter is the entity, which is actually in charge of performing the function remotely requested by the multimedia application. A typical example is a shared printer device, where multimedia applications send a text message to the printer (the server) through a client printer program located in the computing unit where the user application resides.

Services can be made available to multimedia applications in a mobile ad-hoc network by placing them onto one or more nodes. Therefore, multimedia applications need first to discover the services available in the given mobile ad-hoc network before selecting and using the one that best fits the multimedia applications need's out of pool of equivalent services. Besides, multimedia applications should monitor services presence in the mobile ad-hoc network in order to timely be informed of and adapt to any changes in the services availability.

On the other hand, mobile ad-hoc network nodes providing services need to advertise their services availability on the network by indicating—if necessary—any specific service characteristic that might be helpful for multimedia applications in order to properly select the service or the services of choice. For example, a node managing a pool of printer devices can publish each of them along with a set of parameters, which specify what kind of data format each printer can support, whether a given printer is able to print black and white or colour pictures, and so forth. These service attributes may even be dynamically changed in order to reflect a certain status of the given service. Such changes can be done either by the node controlling the service or by a remote node. In both cases, special service management interfaces are required, along with an authentication mechanism to restrict access to unauthorised personnel. On the other hand, any service attribute change should be immediately notified to every multimedia application that might be interested in such events.

Currently, there is a vast set of vendors-proprietary and/or standardised technologies that can be effectively used in order to create multimedia applications over different types of networked environment. Examples of such technologies or related technologies are named in the following. In relation to activation and persistency framework, Sun Microsystems Inc. provides the Java activation framework. As device discovery protocols, Bluetooth SIG proposes the Bluetooth technology and Motorola Inc. proposes the Piano technology. Sun Microsystems Inc. proposes the Jini technology in relation to dynamic service attributes. An example for mobile ad-hoc networks is the MANET-technology proposed by the internet engineering task force (IETF). IETF further proposes the INSIGNIA technology for quality of service based routing protocols for mobile ad-hoc networks. Mobile multimedia applications over mobile ad-hoc networks are proposed on the basis of the Bluetooth technology by Bluetooth SIG and the Piano technology by Motorola Inc. Service discovery protocols are proposed by Sun Microsystems Inc. in the Jini technology, by IETF in the Simple Service Discovery Protocol (SSDP) and Service Location Protocol (SLP) and by Motorola Inc. in the Piano technology. Tuple spaces are proposed by David Gelernter in the Linda technology and by Sun Microsystems Inc. in the Java Spaces technology.

In order to use these known technologies, (mobile) multimedia developers have to commit themselves to a specific vendor solution or standard technology, at the expense of lack of multimedia application interoperability and unease upgradability of legacy multimedia applications to new technologies.

The object of the present invention is therefore to provide a communication device as well as software for operating multimedia applications in one or more communication networks, which provide an abstract and unified solution for implementing and operating multimedia applications over any kind of networked environment. A further object is to provide multimedia application users with an easy to use and customisable view of the current state of the networked environment where the multimedia application is residing in.

The above objects are achieved by a communication device according to claim 1 and software according to claim 10.

The communication device for operating multimedia applications in one or more communication networks according to claim 1 comprises transmitting and receiving means for transmitting and receiving information in said one or more communication networks, a computing manager unit for managing and providing multimedia applications on the basis of a communication with one or more other devices in the one or more communication networks, whereby the computing manager unit controls a device discovery manager unit for detecting the availability of one or more devices and/or one or more communication networks, a service discovery manager unit for providing available services from and/or for said one or more communication networks, and a virtual device manager unit providing a graphical user interface for controlling devices and/or services of said one or more communication networks.

The software or the computer program product for operating multimedia applications in one or more communication networks according to claim 10 comprises a computing manager unit for managing and providing multimedia applications on the basis of a communication with one or more communication devices in the one or more communication networks, whereby the computing manager unit controls a device discovery manager unit for detecting the availability of one or more devices and/or one or more communication networks, a service discovery manager unit for providing available services from and/or for said one or more communication networks, and a virtual device manager unit providing a graphical user interface for controlling devices and/or services of said one or more communication networks. The computing manager unit, the device discovery manager unit, the service discovery manager unit and the virtual device manager unit are in this case pieces of software or a computer program product loadable in a memory, a storage medium or the like.

The present invention is particularly advantageous in relation to the implementation and operation of mobile multimedia applications in mobile ad-hoc networks. Particularly, the device discovery manager unit, the service discovery manager unit and the virtual device manager unit according to the present invention together offer a set of functionalities that (mobile) multimedia applications—based on distributed processing architectures—can effectively use for operating in any network environment. The graphical user interface provided by the virtual device manager unit is a unified, customisable and automatically generated graphical user interface.

Advantageously, the service discovery manager unit is adapted for making services available for said one or more communication networks. In this case, the communication device according to the present invention is a server device and the software according to the present invention is a server software providing services for other nodes or devices in the one or more communication networks.

Additionally or alternatively, the service discovery manager unit is adapted for obtaining knowledge about available services from said one or more communication networks. In this case, the communication device according to the present invention may be a client device and the software according to the present invention may be a client software requesting services from nodes or devices in the one or more communication networks.

Advantageously, the computing manager unit is an ad-hoc computing manager unit for managing and providing (mobile) multimedia applications in a mobile ad-hoc communication network. The communication device according to the present invention may be a mobile or a static device or node in a (mobile) ad-hoc communication network or any other type of communication network depending on the application.

Further advantageously, the communication device and the software, respectively, according to the present invention comprise a tuple-space manager unit for providing a tuple-space functionality for multimedia applications within the context of a mobile ad-hoc network.

Further advantageously, the communication device and the software, respectively, according to the present invention comprise a daemon manager unit providing a platform independent functionality to control a further set of server sub-units provided by a respective multimedia application and making available different services in the one or more communication networks.

Advantageously, the computing manager unit further controls a protocol mapping manager unit providing a protocol inter-working mechanism in order to offer multimedia applications a seamless communication network architecture. In this case, the protocol mapping manager unit comprises advantageously a configurating sub-unit for downloading protocol stack variants from a communication network and a routing sub-unit for routing messages across different protocol stack implementations.

Further advantageously, the computing manager unit further controls a quality-based routing manager unit for delivering information to a remote device or network along paths that meet the quality of service requirements of the respective multimedia application best.

In case of the communication device according to the present invention, the device discovery manager unit, the service discovery manager unit, the virtual device manager unit, the tuple-space manager unit, the daemon manager unit, the protocol mapping manager unit and the quality-based routing manager unit, respectively, are implemented in the communication device. In case of the software or the computer program product, respectively, according to the present invention, these (software) units may be implemented or stored in a communication device or a node of a communication network or may only partially be implemented in a communication device or a node of a communication network, whereby some of those (software) units may be downloaded from other communication devices or nodes if required depending on a respective application.

The present invention is particularly advantageous in encompassing multiple functionalities needed for enabling (mobile) multimedia applications to effectively use communication networks, as e.g. mobile ad-hoc networks. Hereby, the present invention allows (mobile) communication devices to gain knowledge about the environment surrounding them and how to get benefits out of that. Further, it offers a seamless view of multi-vendor mobile ad-hoc network environments. Also, it allows fast deployment and maintenance of mobile ad-hoc networks and allows a mobile ad-hoc network integration with existing fixed networks. The present invention further offers a unified information-routing mechanism based on (mobile) multimedia application quality of service constraints.

The present invention further allows a fast deployment of services over any type of network. Hereby, the present invention abstracts service persistency and lazy activation technologies.

The present invention further allows easy access to and efficient use of various tuple-spaces implementations for achieving synchronisation and communication among (mobile) multimedia applications tasks running on different network nodes. The present invention is based on an open architecture for easily accommodating any related new base technology as soon as it becomes available. Further, the present invention introduces the concept of a virtual device, which is an interactive and unified view of the computer network available in the surroundings and, at the same time, a powerful tool for automatically assembling customisable graphical use interfaces representing a unified control for sets of networked resources.

The specific advantages of the present invention over the prior art are that the present invention offers a unified set of mechanisms and tools necessary for allowing (mobile) multimedia applications to effectively use any type of network model, and particularly mobile ad-hoc networks, by integrating the state of the art technologies and providing a set of application programming interfaces. By using them, (mobile) multimedia application developers can thus rapidly and concisely create (mobile) multimedia applications operating in any network environment. Further, the present invention offers a seemless view of heterogeneous multi-vendor networks, as logical and physical mobile ad-hoc networks. Further, the present invention allows to create automatically a customised graphical user interface for inspecting, controlling and using the network and available network resources. Additionally, the present invention leaves open the possibility to create entry gateway servers for achieving better performance in providing mobile users with customisable access to the network environment. The present invention further offers (mobile) multimedia applications a socket-based application programming interface unit for quality of service-based adaptive routing. Further, the present invention allows easy, dynamic communications protocol stack upgrade on demand. Additionally, new base technologies can be easily integrated in the concept of the present invention.

In the following description, the present invention is described in more detail by means of preferred embodiments thereof relating to the enclosed drawings, in which.

Figure 1:
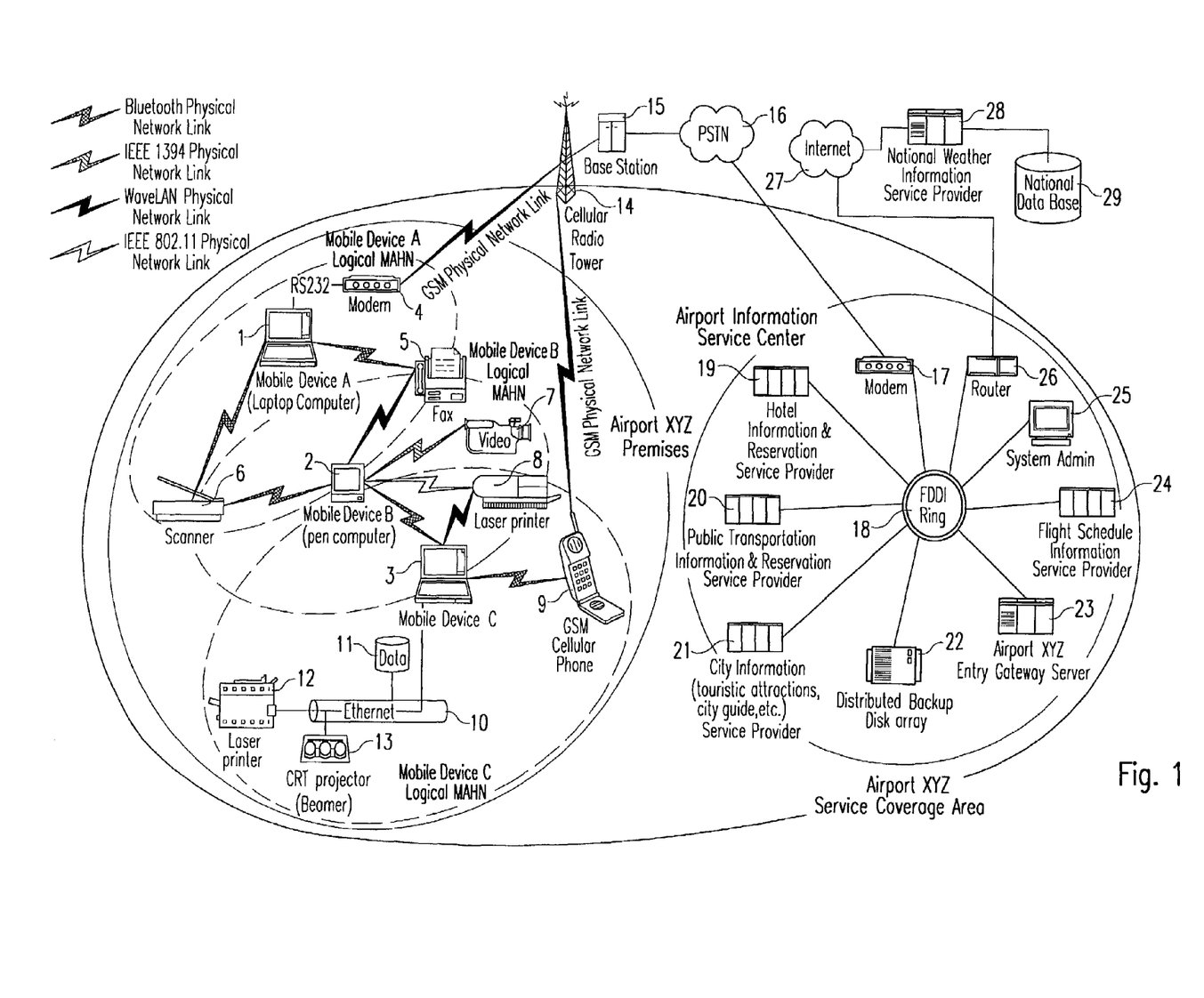
FIG. 1 shows an example of the use of the present invention in mobile ad-hoc networks and an airport information service center.

FIG. 1 shows a schematic example of mobile ad-hoc networks and fixed communication networks for providing airport information service on the basis of the present invention. Thereby, a laptop computer 1 (mobile device A), a pen computer (mobile device B), and another laptop computer 3 (mobile device C) are shown as examples for mobile communication devices embodying the present invention. All three mobile devices are part of a respective local mobile ad-hoc network with further static or mobile communication devices. The first laptop computer 1 forms a logical mobile ad-hoc network with a modem 4, a fax 5 and a scanner 6. Thereby, the laptop computer 1 is connected to the modem 4 through a wired RS232 connection to the fax 5 by a Bluetooth physical network link and to the scanner 6 through a IEEE 1394 physical network link. The pen computer 2 also is part of the logical ad-hoc network of the laptop computer 1. The pen computer 2 is thereby connected via a WaveLan physical network link to the fax 5 and through a Bluetooth physical network link to the scanner 6.

A second logical mobile ad-hoc network is formed around the pen computer 2 and comprises the fax 5, the scanner 6, a video camera 7, a laser printer 8 and another laptop computer 3 (mobile device C). The pen computer 2 is thereby connected to the video camera 7 by a IEEE 1394 physical network link, to the laser printer 8 by a IEEE 802.11 physical network link and to the laptop computer 3 through a Bluetooth physical network link. The laser printer 8 and the laptop computer 3 are connected through a WaveLan physical network link.

A third logical mobile ad-hoc network is formed around the laptop computer 3 (mobile device C) and comprises the pen computer 2, the laser printer 8, a GSM cellular phone 9 and a local Ethernet 10 with connected devices. Thereby, the laptop computer 3 is connected by a wired connection to the Ethernet 10 and through the Ethernet 10 to a data memory 11, a CRT projector or beamer 13 and a laser printer 12. Further, the laptop computer 3 is connected through a Bluetooth physical network link to the GSM cellular phone 9, through a WaveLan physical network link to the laser printer 8, and through a Bluetooth physical network link to the pen computer 2. The GSM cellular phone 9 is connected through a GSM physical network link to a cellular radio tower 14 connected to a base station 15 of a wireless telecommunication system (GSM system). Further, the modem 4 of the first logical mobile ad-hoc network is connected to the cellular radio tower 14 also through the GSM physical network link.

In the shown example, the laptop computer 1, the pen computer 2 and the laptop computer 3 are examples for communication devices for operating multimedia applications in one or more communication networks according to the present invention. Further, also the GSM cellular phone 9 might be a communication device according to the present invention. Thus, a traveller transiting an airport XYZ, the service coverage area of which is shown in FIG. 1, can access and use a broad set of functionality made available by the airport administration. For example, the traveller can, through his laptop computer 1, his pen computer 2 or his laptop computer 3, control and operate multimedia applications in the respective devices being part of the respective logical mobile ad-hoc network as described above. Further, the traveller is able to access functions provided by an airport information service center being connected to the base station 15 of the wireless GSM telecommunication system through a wired telephone network, as e.g. a PSTN network 16 via a modem 17. The airport information service center comprises a hotel information and reservation service provider 19, a public transportation information and reservation service provider 20, a city information service provider 21 providing tourbus attractions, city guide etc., a distributed back-up disk array 22, an airport XYZ entry gateway server 23, a flight schedule information service provider 24, a system administrator 25 and a router 26 connected to further services. The devices of the airport information service center are connected through a FDDI ring 18. Thus, a traveller can, through his mobile communication device, access and use all kinds of local information from the airport information service center. Further, the laptop computer 1, the pen computer 2 or the laptop computer 3 are also able to interact with airport services, e.g. for making hotel reservations. Besides the sheer local information, travellers can also access nationwide data bases, like a national weather data base 29 connected to a national weather information service provider 28 connected to the internet 27. These kind of accesses are made available to travellers through the mediation of the entry gateway server 23 of the airport information service center. The entry gateway server 23 is also a communication device for operating multimedia applications in one or more communication networks according to the present invention. Thereby, the entry gateway server can contact a national data base holding a user's preferences and offer travellers their preferred template describing the set of (mobile) multimedia applications graphical user interfaces and triggered based actions for interacting with any airport information service. Hereby, the local airport information service will adapt this template to the local environment, which means that certain services/resources specified in the template might not be available in that particular area. On the other hand, additional services/resources that might be locally available but that are not indicated in the user's template cannot be presented to the user leaving him the decision whether to use them or not. The entry gateway server can also store predefined downloadable graphical user interface subunits to be loaded into the virtual device manager units of communication devices like the laptop computer 1, the pen computer 2 or the laptop computer 3 (for more detail explanation of the communication devices and the software according to the present invention see FIGS. 2 to 4 and the corresponding description) for speeding up travellers interactions with the network environment.

Figure 2:
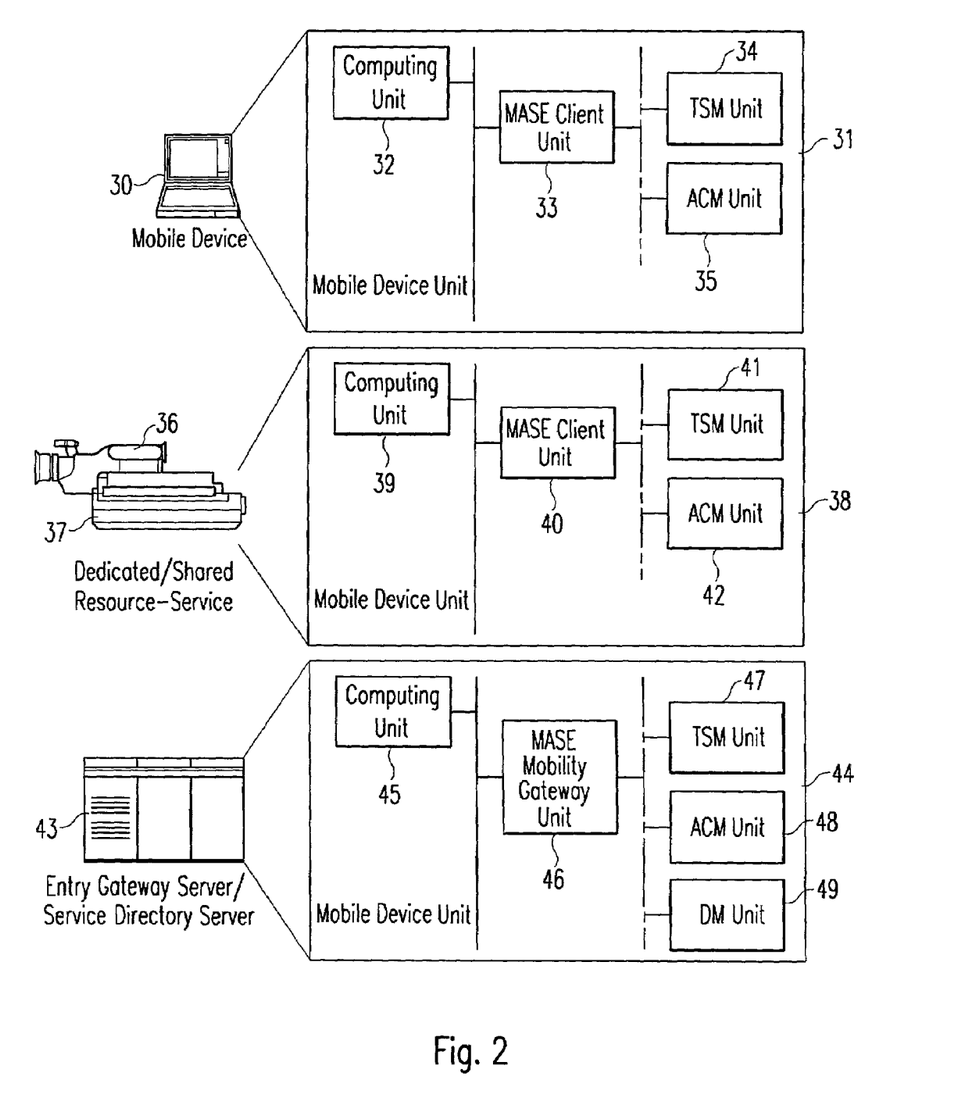
FIG. 2 shows an example of the logical to physical mapping in several communication devices according to the present invention.

The above scenario can be realised by implementing in each user mobile device, fixed and/or mobile dedicated resources and fixed and/or mobile shared resources/services a computing unit hosting client domain Mobile Application Support Environment (MASE) software units. Each of these MASE units internally uses the (Ad-Hoc) Computing Manager unit and optionally the Tuple Space Manager unit (cf. detailed description in relation to FIGS. 2 to 4). At the entry gateway server level, a mobility gateway MASE software unit can be hosted on a properly fit computing unit. Also in this case, the entry gateway server can be effectively implemented by using the (Ad-hoc) Computing Manager (ACM) unit, the Daemon Manager (DM) unit and the Tuple Space Manager (TSM) unit (cf. detailed description of FIGS. 2 to 4). This logical to physical mapping is schematically shown in FIG. 2. FIG. 2 shows a mobile device 30, as e.g. a laptop computer, which comprises a mobile device unit 31. The mobile device unit 31 comprises a computing unit 32, on which a mobile application support environment (MASE) client unit 33, which is a software unit, is active. The MASE client unit 33 uses an ad-hoc manager unit 35 and optionally a tuple space manager unit 34 for operating multi media applications in one more communication networks. FIG. 2 further shows a video camera 36 and printer 37 as examples for fixed and mobile dedicated/shared resources or services comprising a mobile device unit 38 with a computer unit 39. On the computing unit 39, a Mobile Application Support Environment (MASE) client unit 40, which is a software unit, is active by using an ad-hoc computing manager unit 42 and optionally a TSM unit 41. Further, an entry gateway server/service directory server 43 is schematically shown to comprise a mobile device unit 44 with a computing unit 45. On the computing unit 45, a mobile application support environment (MASE) mobility gateway unit 46 is active, which uses an ad-hoc computing manager unit 48, and optionally a TSM unit 47 and a damon manager unit 49. The detailed functionality of these software units is described in relation to FIG. 3 and FIG. 4.

Figure 3:
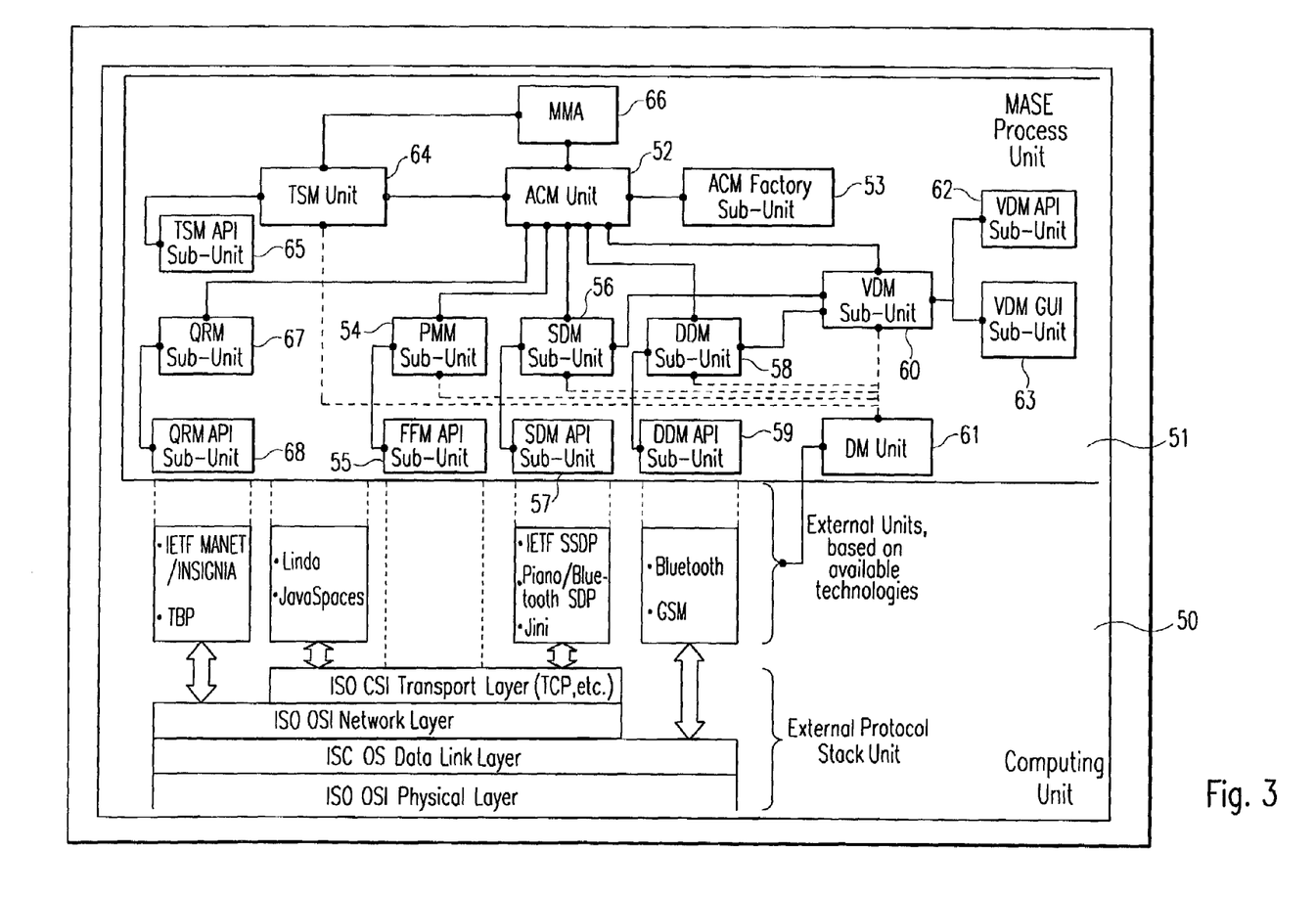
FIG. 3 shows a block diagram of a computing unit of a communication device according to the present invention.

FIG. 3 shows a schematic diagram of a computing unit 50 being implemented in a communication device according to the present invention and comprising the software units according to the present invention. The computing unit 50 may for example be implemented as a computing unit 32 in the mobile device 30, as computing unit 39 in the camera 36 or the printer 37 or as a computing unit 45 in the entry gateway server/service directory server 43 as shown in FIG. 2. Also, the computing unit 50 could be implemented in a laptop computer 1, a pen computer 2 or a laptop computer 2 as shown in FIG. 1. Further, the computing unit 50 could for example be implemented in a cellular phone as communication device according to the present invention. Hereby, the computing unit 50 shown in FIG. 3 refers to the most general case of network entities powered according to the present invention, which are for example the entry gateway server and/or the service directory server. In case that mobile devices are used as communication devices according to the present invention, the computing unit 50 may comprise not all of the shown software units. The essential units for realising the present invention are a computing manager unit shown as an ad-hoc computing manager unit 52, a device discovery unit 58 and the service discovery unit 56 and the corresponding necessary sub-units. FIG. 3 thereby depicts essentially the internal structure of the ad-hoc computing manager unit 52, the tuple space manager unit 64 and the daemon manager unit 61 which are implemented in a MASE process unit 51 of the computing unit 50, the synergies among these units and the relationship among such units, commercial of the shelf units and the mobile multi media applications.

The ad-hoc computing manager unit 52 is a software unit specifically designed for providing mobile multimedia applications with mobile ad-hoc network support. The ad-hoc computing manager unit offers an ad-hoc computing manager application programming interface, which in turn is composed of many sub-application programming interfaces, one for each of the following main ad-hoc computing manager functionalities:

- device discovery manager (DDM): offers mobile multimedia applications unified mechanism for detecting any network topology change,
- service discovery manager (SDM): offers mobile multimedia applications unified mechanisms for obtaining knowledge about the available network services and making such services available in the network,
- protocol mapping manager (PPM): offers mobile multimedia applications a seemless view of the network by integrating (either on provision or on demand basis) different network topologies,
- quality based routing manager (QRM): offers mobile multimedia applications unified routing mechanisms for delivering information to remote nodes along paths that best meet the quality of service requirements of the multimedia applications,
- virtual device manager (VDM): offers mobile multi media applications a global, customizable, automatically generated graphical user interface for controlling user selected network resources.

Each of the above functions is provided as an ad-hoc computing manager sub-unit in a MASE process unit 51 of the computing unit 50. Thus, the ad-hoc computing manager unit 52 comprises a device discovery manager sub-unit 58, a service discovery manager sub-unit 56, a protocol mapping manager sub-unit 54, a quality based routing manager sub-unit 67 and a virtual device manager sub-unit 60. Further, the ad-hoc computing manager unit 52 comprises one or more mobile multimedia application units 66. As mentioned above, all these features and functions are easily extendable to network models other than mobile ad-hoc networks. Thus, the ad-hoc computing manager unit 52 is a component that can be used uniformly across different contexts.

Mobile multimedia applications can access multiple different physical ad-hoc networks through an ad-hoc computing manager, whereby each link can be associated with a vendor-specific technology. The ad-hoc computing manger unit 52 abstracts out this detail via the protocol mapping manager unit 54. This feature leads to the notion of logical mobile ad-hoc networks, which represent a set of different physical mobile ad-hoc network technologies integrated together. Furthermore, each mobile ad-hoc network vendor solution can implement mechanisms for simultaneously creating and managing multiple instances of a mobile ad-hoc network in a given geographically delimited area, for example bluetooth scatter nets. The ad-hoc computing manager unit 52 abstracts out this concepts as well by introducing the notion of a local mobile ad-hoc network identifier that is a reference (local with respect to the given note) identifying the given instance of a physical mobile ad-hoc network within the contest of the logical mobile ad-hoc network.

A possible application of these concepts is the following. User mobile devices are generally light weight, resourced-constrained pieces of equipment so that accessing or using mobile ad-hoc networks can become a very expensive task. At any given time, a mobile device can in fact enter within the range of effectiveness of more than one logical ad-hoc network, as for example shown in FIG. 1, or simply within the range of a single big logical ad-hoc network. In either case, it should be time and resource consuming to carry out device discovery, service discovery and virtual device generation on the mobile device. A possible solution can be to identify logical mobile ad-hoc networks as network domains, which are in the case of mobile ad-hoc networks spontaneously created, which a roming device entering them can access in an efficient manner by relying on an entry gateway server, as for example the entry gateway server 23 shown in FIG. 1. Such a server would provide visiting devices with pre-build virtual devices that could be downloaded, along with resource reservation, on demand. Additionally, the entry gateway server could validate the user authentication, authorize users to use certain resources, maintain a user profile data base containing a preferred or stored view of the network or so on. Here, a MASE mobility gateway, as for example the MASE mobility gateway 46 of the entry gateway servers 43 shown in FIG. 2 is of particular use to perform these functions.

The ad-hoc computing manager unit 52 may be implemented according to the MASE component container model and the factory design pattern. Therefore, the ad-hoc computing manager unit 52 additionally has an ad-hoc computing manager factory sub-unit 53 which is in charge of an dynamically activating the ad-hoc computing manager sub-units during the runtime of the system.

Through its ad-hoc computing manager factory sub-unit 53, the ad-hoc computing manager unit 52 is thus simply controlling the activation of and access to the set of its sub-units. Therefore the ad-hoc computing manager unit 52 has only sub-unit coordination functionality, whereby the inner working of the ad-hoc computing manager unit is distributed across the set of these sub-units. Besides each sub-unit is structured so as to provide a management application programming interface on demand.

In the following, the ad-hoc computing manager sub-units are explained in more detail.

The device discovery manager sub-unit 58 provides an abstraction of mobile ad-hoc network topology changes detection mechanisms. From this perspective, the device discovery manager can effectively use various available technologies, like Bluetooth. The device discovery manager sub-unit 58 provides mobile multimedia applications with the following functionalities:

- Register mobile multimedia application's interest in monitoring topology changes in one of the logical mobile ad-hoc networks managed by a device discovery manager sub-unit 58,
- Register mobile multimedia application's interest in monitoring topology changes in one of the vendor-specific mobile ad-hoc networks managed by the device discovery manager sub-unit 58,
- Notification of newly discovered devices in a logical mobile ad-hoc network,
- Notification of newly discovered devices in the vendor-specific mobile ad-hoc network,
- Notification of an already discovered device leaving the logical mobile ad-hoc network,
- Notification of an already discovered device leaving the vendor-specific mobile ad-hoc network.

The device discovery manager sub-unit 58 internally addresses issues like network address allocation and data-link to network address resolution. Analogously to the ad-hoc computing manager unit 52, the device discovery manager sub-unit 58 may be implemented according to the MASE component container model and the factory design pattern, insofar as the device discovery manager sub-unit 58 is designed to accommodate various sub-units, which are activated at initialisation time, each providing an access to a specific state of the art device discovery technology, for example on the basis of Bluetooth, GSM or the like. The device discovery manager sub-unit 58 further comprises a device discovery manager application programming interface sub-unit 59.

The service discovery manager sub-unit 56 provides an abstraction of various available service discovery mechanisms. Such mechanisms allow mobile multi media applications to:

detect the presence of services available in the given mobile ad-hoc network, select the one that best fits the users needs based on service properties, being notified whenever services are made available on the mobile ad-hoc network, are put out of service, or are simply modified in terms of service attributes.

On the other hand, from the service provider perspective, the service discovery manager sub-unit 56 facilitates the publishing, management and putting out of service of the given service. From this perspective, the service device managers sub-unit 56 can effectively use various available technologies, like Jini through the corresponding service device manager application programming interface sub-unit 57. The general model behind service discovery is based on the concept of the service directory server, a software unit residing in a well defined location, which can be used as a yellow pages book to retrieve service availability and location information. The service discovery manager sub-unit 56 provides mobile multimedia applications with the following functionalities:

register mobile multimedia application's interest in monitoring service availability changes in one of the logical mobile ad-hoc networks, register mobile multimedia application's interest in monitoring service availability changes in one of the vendor-specific mobile ad-hoc networks, notification of newly discovered services in the logical mobile ad-hoc network, notification of newly discovered services in the vendor-specific mobile ad-hoc network, notification of newly discovered service directory services in the logical mobile ad-hoc network, notification of newly discovered service directory services in the vendor-specific mobile ad-hoc network, notification of modified and/or deleted services in the logical mobile ad-hoc network, notification of modified and/or deleted services in the vendor-specific mobile ad-hoc network, notification of deleted service directory services in the logical mobile ad-hoc network, notification of deleted service directory services in the vendor-specific mobile ad-hoc network, selection of the given service or a set of services out of the list of published ones in the service directory service: this selection can be based either on exact or inexact tuple matching.

The service discovery manager sub-unit 56 provides service providers with the following functionalities:

register a service with a given service directory server or with a set thereof service management (modification of published service attributes)

deregistration of a service from one or multiple service directory service.

The service discovery manager sub-unit 56 is built around the concept of service and service group software units. These are templates from which any service software unit can be derived. These templates hide to service developers all the service discovery manager details including service discovery manager related information management application programming interface implementation. Furthermore, these units feature built-in support for persistency of service information, on demand activation of services (important features for limiting resource consumption in resource constrained devices such as mobile devices). It is to be noted, that this feature can be used also for any other MASE software unit not registered with any service directory server, but willing to be activated on request and/or restored to the state the unit was in before a system crash or a shutdown.

Analogously to the ad-hoc computing manager unit 52, the service discovery manager sub-unit 56 can be implemented according to the MASE component container model and the factory design pattern, insofar as the service discovery manager sub-unit 56 is designed to accommodate various sub-units, which are activated at initialisation time, each providing access to a specific state of the art service discovery technology, such as IETF SSDP, SLP, Piano/Bluetooth or Jini.

The protocol mapping manager sub-unit 54 implements protocol inter-working mechanisms, which are necessary whenever a message has to be routed from one physical mobile ad-hoc network to another mobile ad-hoc network. This functionality can be required in order to provide seamless network architectures, where different mobile ad-hoc network technologies are integrated together. Typically, standard protocol stacks like IP already offer this functionality. However, it may happen that when a user travelling to a foreign country is unable to use his mobile device due to protocol compatibility problems caused by different telecommunications regulations between the user's home country (where the device was assembled/registered) and the visited country. A typical example are the many different cellular phone technologies currently available, which are not uniformly and worldwide used. The protocol mapping manager sub-unit 54 offers a dynamic protocol stack reconfiguration. The software unit implementing the functionality of the given local protocol stack variant can be directly downloaded from a well-known network server, as e.g. the above-mentioned entry gateway server. This code can then be either directly used or bound to the devices native protocol via a protocol inter-working functionality. The later case applies whenever the user decides to link his private mobile ad-hoc network, (e.g. composed of a set of user's network devices, like a digital camera, a microphone and a camcorder and the like), and an already existent mobile ad-hoc network which is available in the surroundings. The protocol mapping manager sub-unit 54 therefore comprises two further sub-units, the protocol mapping manager configurator (PMMC) which allows users to download local protocol stack variants and a protocol mapping manager router (PMMR), which routes messages across different protocol stack implementations. The PMMR is designed as a general purpose interworking functionality. Further, the protocol mapping manager sub-unit 54 comprises a protocol manager mapping application programming interface sub-unit 55.

The quality-based routing manager sub-unit 67 offers an abstraction of various state of the art ad-hoc quality of service routing mechanisms, like the distributed ticket-based probing routing algorithm used in conjunction with RSVP and a distance vector. The quality of service-based routing manager sub-unit (QRM sub-unit) 67 searches for and finds the best feasible path and any alternative path with given quality of service constraints leading to the given destination node with respect to a given logical or physical mobile ad-hoc network. The QRM sub-unit 67 provides mobile multimedia applications with the following functionality:

- send data towards a given node or a given logical or physical mobile ad-hoc network by ensuring that mobile multimedia application's specific quality of service requirements such as minimum bandwidth, maximum delay, maximum delay variation, minimum cost, etc. can be met,
- examine the path list (best feasible path and alternative paths) for a given destination node with given quality of service constraints in respect to a given logical mobile ad-hoc network,
- examine the path list (best feasible path and alternative paths) for a given destination node within given quality of service constraints in respect to a given physical mobile ad-hoc network,
- register mobile multimedia application's interest in monitoring path changes due to re-routing caused by topology changes or degraded path quality of service support in a given logical mobile ad-hoc network,
- register mobile multimedia application's interest in monitoring path changes due to re-routing caused by topology changes or degraded path quality of service support in a given physical mobile ad-hoc network.

The QRM sub-unit 67 provides nodes administrators with the following functionalities:

- configure link costs and quality of service properties,
- configure level of redundancy required in order to avoid or at least limit any service degradation or even disruption which might occur during topology changes affecting a given path,
- examine the quality of service properties for a given link.

Available protocol network layers, like IP/MANET-INSIGNIA should implement this component. The present invention can equally use a built-in quality of service based routing algorithm, which is modularly designed so as to accommodate future publicly available standard routing mechanisms. For this reason, the aforementioned functionalities are provided through a socket-based QRM application programming interface sub-unit 68, through which the mobile multimedia application can initiate a communication across the network by opening a "socket", i.e. a logical communication endpoint, towards a given destination node and with a set of required quality of service parameters, like minimum bandwidth, maximum delay, etc. The communication relationship is released by closing this socket. Analogously to the ad-hoc computing manager unit 52, the QRM sub-unit 67 can be implemented according to the MASE component container model and the factory design pattern, insofar as the QRM sub-unit 67 is designed to accommodate various sub-units, which are activated at initialisation time, each providing access to a specific state of the art Quality of Service based routing technology.

The ad-hoc computing manager unit 52 further comprises a virtual device manager sub-unit 60 providing MASE human users with an interactive, unified and customisable view of the network environment reflecting the current state of the given logical or physical mobile ad-hoc network. As such, the virtual device manager sub-unit 60 exploits other ad-hoc computing manager sub-units like the device discovery manager sub-unit 58 and the service discovery manager sub-unit 56 in order to offer a set of graphical user interfaces for interactively accessing and controlling the network environment.

In order to provide this function, the virtual device manager sub-unit 60 comprises a virtual device manager graphical user interface sub-unit 63.

As such, the virtual device manager sub-unit 60 provides mobile multimedia application users with contacts, awareness features, insofar as users can be offered a plurality of available tools, utilities and services, which are customised based on the user's location, the user's preferences and/or the user's authorisation/credentials. These features are translated either in a graphical user interface based interactive environment, which the user can easily use to exploit the networked environment surrounding him, or even in a trigger based reaction system. The later consists of a mechanism where users predefined general tasks are activated whenever a set of conditions is met, e.g. the given position, the given user, the given time of the day or the day of the year, etc.

Figure 4:
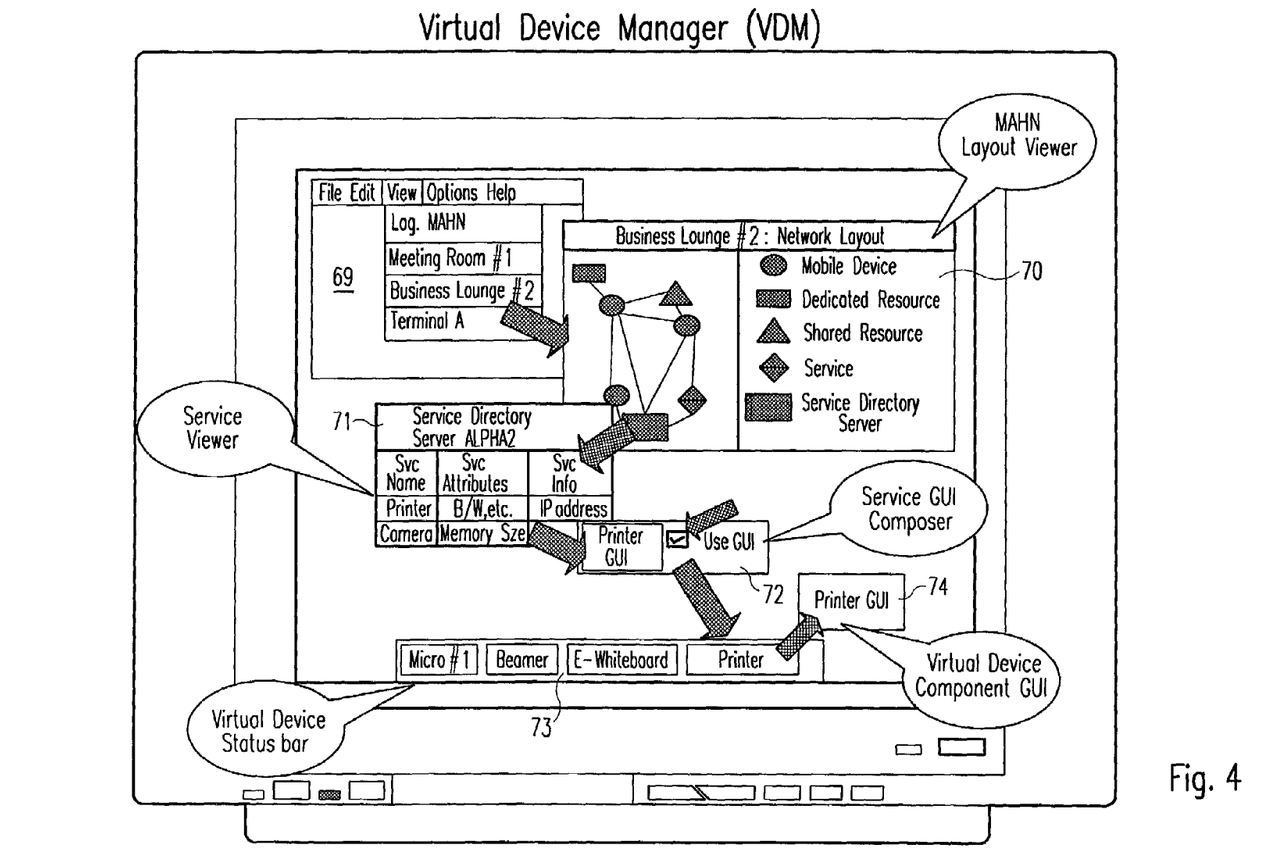
FIG. 4 shows an example of a layout of a graphical user interface provided by a virtual device manager unit according to the present invention.

Additionally, the virtual device manager sub-unit 60 provides an application programming interface sub-unit 62 for administration purposes and for interfacing with other MASE v3 components. The virtual device manager sub-unit 60 provides users with the following functionality, which are schematically shown in FIG. 4 on a display of a computer:

- A graphical user interface window 69 (global window) offering a list of references to logical and physical mobile ad-hoc networks currently active in the geographically delimited area where the user is located. Furthermore a separate list (displayed on the same window 69) indicates all available tuple spaces.
- By selecting any of the listed ad-hoc networks, a subordinate graphical user interface window or MAHN layout viewer 70, offers a graphical representation of the mobile ad-hoc network layout, which is e.g. a graph representing nodes and the corresponding links. Thereby, nodes are displayed with different graphical representations (icons) indicating the node's nature along with location information as provided by the MASE v3 location manager. Various types of nodes are e.g. a manned host, a computing device, as e.g. a personal computer, an unshared resource, such as a peripheral device like a microphone, a shared resource, such as a printer, a service directory server or a published service. By clicking on the icon corresponding to the service directory server, a dialog window or service viewer 71 is created. Through this window, the user can narrow down the selection of the service or the services to be displayed. By entering a wild card information, the whole set of services is displayed. The display is implemented as a scrolling list of service names. By clicking on any of them, the given service is selected. By double-clicking, a pop-up window is created which conveys service information, such as the network address of the host where the service resides, service attributes or the like. If the given service is published along with a proxy, a graphical user interface or an agent software unit, such as in the case of Jini, this code is downloaded on the node hosting the virtual device manager sub-unit 60. In the example shown in FIG. 4, double-clicking on the chosen printer indicates the virtual device manager which graphical user it shall assemble (service graphical user interface composer 72). A compositional graphical user interface is represented as a virtual device status bar 73. The final graphical user interface is shown as window 74 (virtual device component graphical user interface). In case that one or more of the nodes displayed on the MAHN window is/are a published service, these services are represented as items connected to a given computing device icon via dashed arcs in order to not create confusion with arcs representing MAHN links. In order to prevent that MAHN graphical representations are clocked up with too many icons, services are graphically represented by a single highlighted icon whenever a certain number (dependent on the image zooming factor) of them is exceeded. In such a case, by clicking on the highlighted service icon, a dialog window is created. Through this window, the user can narrow down the selection of the service or the services to be displayed. By entering wild card information, the whole set of services is displayed. The display is implemented as a scrolling list of service names. By clicking on any of them, the given service is selected. By double-clicking, a pop-up window is created which conveys service information, such as attributes. The information displayed in the MAHN window is updated on a timely basis as soon as node properties change. By accessing this information, users can select any available functionality or service offered by the given node. Links are displayed as arcs connecting nodes icons and indicating the link cost. By manually selecting a link, as e.g. by clicking the left mouse button, users are provided with a pop-up menu indicating links quality of service properties. This information is updated on a timely basis, as soon as such properties change.

The graphical representation of the MAHN graph is updated on a timely basis as soon as such topology changes occur.

Any selected functionality or service and the location of any downloaded code are annotated on a user profile. The user can either choose to modify a pre-existing user profile or create a new file for saving it. Common state of the art graphically user interface techniques for opening an existing file or creating a new one can hereby be employed.

Once the functionality or service selection phase is completed by clicking on a specific button of the MAHN window, a subordinate window offering the unified graphical user interface representation of the selected functionality or service is finally created, such as the window 74 of FIG. 4 (virtual device window). The virtual device manager sub-unit 60 takes care of assembling this window and modifies it whenever a functionality or service is no longer available or no longer meets the user's needs. This is the case for services whose attributes are dynamically changed in such a way that the original user choice is no longer satisfied. Individual functionality/service graphical user interface windows created on the fly by the virtual device manager sub-unit 60 and downloaded services proxy/agents graphically user interfaces concur to assemble the virtual device window.

The graphical user interface thus created includes any multimedia interface which might be needed for allowing user interaction with the network devices represented by such an interface. For example, a microphone graphical user interface can provide features for controlling the microphone status (on/off button), whereas a head set graphical user interface can provide features for controlling the status (on/off button) but also the audio signal volume (volume sliding bar) and balance (balance sliding bar).

The MASE process unit 51 of the computing unit 50 as schematically shown in FIG. 3 further comprises a tuple space unit 64 offering mobile multimedia applications and abstracting of various available implementations of the tuple spaces concept, like Linda or JavaSpaces. The tuple space manager unit 64 comprises a tuple space manager application programming interface sub-unit 65 and provides mobile multimedia applications with the following functionalities:

register mobile multimedia application's interest in monitoring tuple spaces availability changes in one of the logical mobile ad-hoc networks, register mobile multimedia application's interest in monitoring tuple spaces availability changes in one of the vendor-specific mobile ad-hoc networks, notification of newly discovered tuple spaces in the logical mobile ad-hoc network, notification of newly discovered tuple spaces in the vendor-specific mobile ad hoc networks, notification of modified and/or deleted tuple spaces in the logical mobile ad-hoc networks, notification of modified and/or deleted tuple spaces in the vendor-specific mobile ad-hoc networks, register mobile multimedia application's interest in monitoring newly written tuples which satisfy a certain template in one of the tuple spaces managed by the tuple space manager unit 64, write a new tuple into the give tuple space, synchronous, i.e. blocking, reading of any matching tuple from a given tuple space, synchronous, i.e. non-blocking reading of any matching tuple from a given tuple space, synchronous, i.e. blocking until one exists, taking of a matching tuple from the space, synchronous, i.e. non-blocking, taking off a matching tuple from the space.

The tuple space manager unit 64 provides tuple space providers with the functionality of activation, management and deactivation of a tuple space within the context of a logical or physical mobile ad-hoc network.

Analogously to the ad-hoc computing manager unit 52, the tuple space manager unit 64 may be implemented according to the MASE component container model and the factory designed pattern, insofar as the tuple space manager unit 64 is designed to accommodate various sub-units, which are activated at initialisation time, each providing access to a specific state of the art tuple space technology.

The MASE process unit 51 of the computing unit 50 shown in FIG. 3 further comprises optionally a daemon manager unit 61 which provides a platform independent functionality for activating, managing and deactivating a set of server software units that might be required by any of the other ad-hoc computing manager sub-units in order to perform the tasks, as e.g. the service directory server. The daemon manager unit 61 is actually a general purpose MASE component and as such it can be used also in different contexts.

The invention claimed is:

1. A communication device for operating multimedia applications in a mobile ad-hoc communication network, the communication device comprising:

transmitting and receiving means for transmitting and receiving information in said mobile ad-hoc communication network;

an ad-hoc computing manager unit for managing and providing multimedia applications on the basis of a communication with one or more other devices in the mobile ad-hoc communication network, said ad-hoc computing manager unit comprising, a device discovery manager unit for detecting the availability of one or more devices and/or one or more communication networks;

a service discovery manager unit for providing available services from and/or for said mobile ad-hoc communication network; and a virtual device manager unit for providing a graphical user interface for controlling devices and/or services of said mobile ad-hoc network, said communication device further comprising, a tuple space manager unit for providing multimedia applications within said mobile ad-hoc communication network with the functionality of activation, management and deactivation of a tuple space within said mobile ad-hoc communication network, wherein said tuple space manager unit includes a tuple space manager factory sub-unit which is in charge of dynamically activating tuple space manager sub-units during runtime of the device, each tuple space manager sub-unit providing access to a vendor-specific tuple space technology, said vendor-specific tuple space technology including a vendor specific tuple space which includes a plurality of tuples, and said tuple space is a virtual shared associative memory and said vendor specific tuple space is a virtual shared associative memory.

2. A communication device according to claim 1, wherein said service discovery manager unit is adapted for making services available for said mobile ad-hoc communication network.

3. A communication device according to claim 1, wherein said service discovery manager unit is adapted for obtaining knowledge about available services from said mobile ad-hoc communication network.

4. A communication device according to claim 1, further comprising:

a daemon manager unit providing a platform independent functionality to control a further set of server sub-units, provided by a respective multimedia application and making available different services in the mobile ad-hoc communication network.

5. A communication device according to claim 1, wherein said computing manager unit further controls a protocol mapping manager unit providing a protocol inter-working mechanism in order to offer multimedia applications a seamless communication network architecture.

6. A communication device according to claim 5, wherein said protocol mapping manager unit comprises a configurating sub-unit for downloading protocol stack variants form a communication network and a routing sub-unit for routing messages across different protocol stack implementations.

7. A communication device according to claim 1, wherein said computing manager unit further controls a quality based routing manager unit for delivering information to a remote device or network along paths that meet the quality of service requirements of the respective multimedia application best.

8. A computer readable medium including computer executable instructions, wherein the instructions, when executed by a processor, cause the processor to operate multimedia applications in a mobile ad-hoc communication network, with an ad-hoc computing manager unit for managing and providing multimedia applications on the basis of a communication with one or more communication devices in the mobile ad-hoc communication network, said computing manager unit comprising:

a device discovery manager unit for detecting the availability of one or more devices and/or one or more communication networks;

a service discovery manager unit for providing available services from and/or for said one or more communication networks; and a virtual device manager unit for providing a graphical user interface for controlling devices and/or services of said mobile ad-hoc network, said software further comprising a tuple space manager unit for providing multimedia applications within said mobile ad-hoc communication network with the functionality of activation, management and deactivation of a tuple space within said mobile ad-hoc communication network, wherein said tuple space manager unit includes a tuple space manager factory sub-unit which is in charge of dynamically activating tuple space manager sub-units during runtime of the device, each tuple space manager sub-unit providing access to a vendor-specific tuple space technology, said vendor-specific tuple space technology including a vendor specific tuple space which includes a plurality of tuples, and said tuple space is a virtual shared associative memory and said vendor specific tuple space is a virtual shared associative memory.

9. The computer readable medium according to claim 8, wherein said service discovery manager unit is adapted for making services available for said mobile ad-hoc communication network.

10. The computer readable medium according to claim 8, wherein said service discovery manager unit is adapted for obtaining knowledge about available services from said mobile ad-hoc communication network.

11. The computer readable medium according to claim 8, further comprising:

a daemon manager unit providing a platform independent functionality to control a further set of server sub-units provided by a respective multimedia application and making available different services in the mobile ad-hoc communication networks.

12. The computer readable medium according to claim 8, wherein said computing manager unit further controls a protocol mapping manager unit providing a protocol inter-working mechanism in order to offer multimedia applications a seamless communication network architecture.

13. The computer readable medium according to claim 12, wherein said protocol mapping manager unit comprises a configurating sub-unit for downloading protocol stack variants form a communication network and a routing subunit for routing messages across different protocol stack implementations.

14. The computer readable medium according to claim 8, wherein said computing manager unit further controls a quality based routing manager unit for delivering information to a remote device or network along paths that meet the quality of service requirements of the respective multimedia application best.

15. A communication device according to claim 1, wherein said tuple space manager unit is configured to notify said multimedia applications of newly discovered or deleted tuple spaces in said mobile ad-hoc network.

16. A communication device according to claim 1, wherein said tuple space manager unit is configured to write a tuple to the tuple space and to delete a tuple from the tuple space.

17. A communication device according to claim 1, wherein said mobile ad-hoc network is a logical mobile ad-hoc network corresponding to a set of different physical mobile ad-hoc networks of different vendor specific network technologies integrated together.

* * * * *